US012109975B2

(12) United States Patent
Turek et al.

(10) Patent No.: US 12,109,975 B2
(45) Date of Patent: Oct. 8, 2024

(54) LOCK MECHANISM FOR STEERING ASSIST SYSTEM

(71) Applicant: Steering Solutions IP Holding Corporation, Saginaw, MI (US)

(72) Inventors: Alan G. Turek, Mayville, MI (US); Jeffrey E. Beyerlein, Frankenmuth, MI (US); Joel A. Bickel, Millington, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1021 days.

(21) Appl. No.: 16/584,131

(22) Filed: Sep. 26, 2019

(65) Prior Publication Data
US 2021/0094507 A1 Apr. 1, 2021

(51) Int. Cl.
*B60R 25/021* (2013.01)
*B62D 5/00* (2006.01)
*F16H 1/16* (2006.01)

(52) U.S. Cl.
CPC .......... *B60R 25/0211* (2013.01); *B62D 5/001* (2013.01); *F16H 1/16* (2013.01)

(58) Field of Classification Search
CPC ........ B60R 25/0211; F16H 1/16; B62D 5/001
See application file for complete search history.

(56) References Cited

U.S. PATENT DOCUMENTS

| 2002/0116962 A1* | 8/2002 | Zillmann | B60R 25/02153 70/186 |
| 2009/0133452 A1* | 5/2009 | Hirche | B60R 25/02153 70/183 |
| 2020/0291681 A1* | 9/2020 | Markanday | F16H 63/36 |
| 2020/0391784 A1* | 12/2020 | Saito | B62D 5/001 |

FOREIGN PATENT DOCUMENTS

| CN | 1671588 A | 9/2005 | |
| CN | 202102950 U | 1/2012 | |
| CN | 109996704 A | 7/2019 | |
| JP | 2004216959 A | 8/2004 | |
| JP | 2006168414 A | 6/2006 | |
| JP | 2014040213 A | 3/2014 | |
| JP | 6393858 B1 * | 9/2018 | B62D 5/001 |

OTHER PUBLICATIONS

English translation of First Office Action regarding corresponding CN App. No. 2020110396797; issued Jul. 7, 2022.

* cited by examiner

*Primary Examiner* — Terence Boes
(74) *Attorney, Agent, or Firm* — Dickinson Wright PLLC

(57) ABSTRACT

A steering assist system of a steering column assembly is provided. The system includes a worm rotatably driven by an actuator. The system also includes a worm gear having a first set of teeth and a second set of teeth, the first set of teeth in meshed engagement with the worm, the worm gear operatively coupled to a steering shaft. The system further includes a lock feature moveable into and out of engagement with the second set of teeth of the worm gear to define a locked condition and an unlocked condition of the worm gear.

6 Claims, 8 Drawing Sheets

LOCK MECHANISM FOR STEERING ASSIST SYSTEM

FIELD OF THE INVENTION

The embodiments described herein relate to vehicle steering systems and, more particularly, to a lock mechanism for a steering assist system.

BACKGROUND

Steering systems commonly include a steering assist system that reduces the effort required by a driver to manually steer the wheels of a vehicle. Such systems may include a lock that is installed in the upper column assembly. Some designs may require that the lock mechanism is located within an assist mechanism housing.

An example of the aforementioned lock mechanism includes an inner hub, a lock sleeve ring, grease and an outer shaft lock sleeve. The lock sleeve ring is captured in compression between the inner hub and the outer shaft lock sleeve. A solenoid activated shaft drops into engagement with the lugs on the outer diameter of the outer shaft lock sleeve during the "locked" condition. As torque is applied through the main shaft that is in engagement with the inner hub, the lock sleeve is designed to resist this torque and prevent movement. Within a predetermined torque range, the lock sleeve ring reaches a "breakaway" torque and is allowed to slip. The assembly must be able to experience several overloads of torque and recover to resist a torque up to the lower torque of the predetermined torque range. This assembly example has three precision components, assembly grease, requires assembly, requires axial space on the output shaft, requires a press operation for the lock assembly and another press operation to install the lock assembly to the shaft assembly and has significant mass. Improving the packaging space and mass of the lock mechanism would be well received by those in the art.

SUMMARY

According to one aspect of the disclosure, a steering assist system of a steering column assembly is provided. The system includes a worm rotatably driven by an actuator. The system also includes a worm gear having a first set of teeth and a second set of teeth, the first set of teeth in meshed engagement with the worm, the worm gear operatively coupled to a steering shaft. The system further includes a lock feature moveable into and out of engagement with the second set of teeth of the worm gear to define a locked condition and an unlocked condition of the worm gear.

According to another aspect of the disclosure, a lock mechanism of a steering assist system is provided. The lock mechanism includes a slide assembly located within a housing of the steering assist system. The lock mechanism also includes a wedge shaped lock feature moveable into and out of engagement with a set of teeth of a worm gear to define a locked condition and an unlocked condition of the worm gear.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
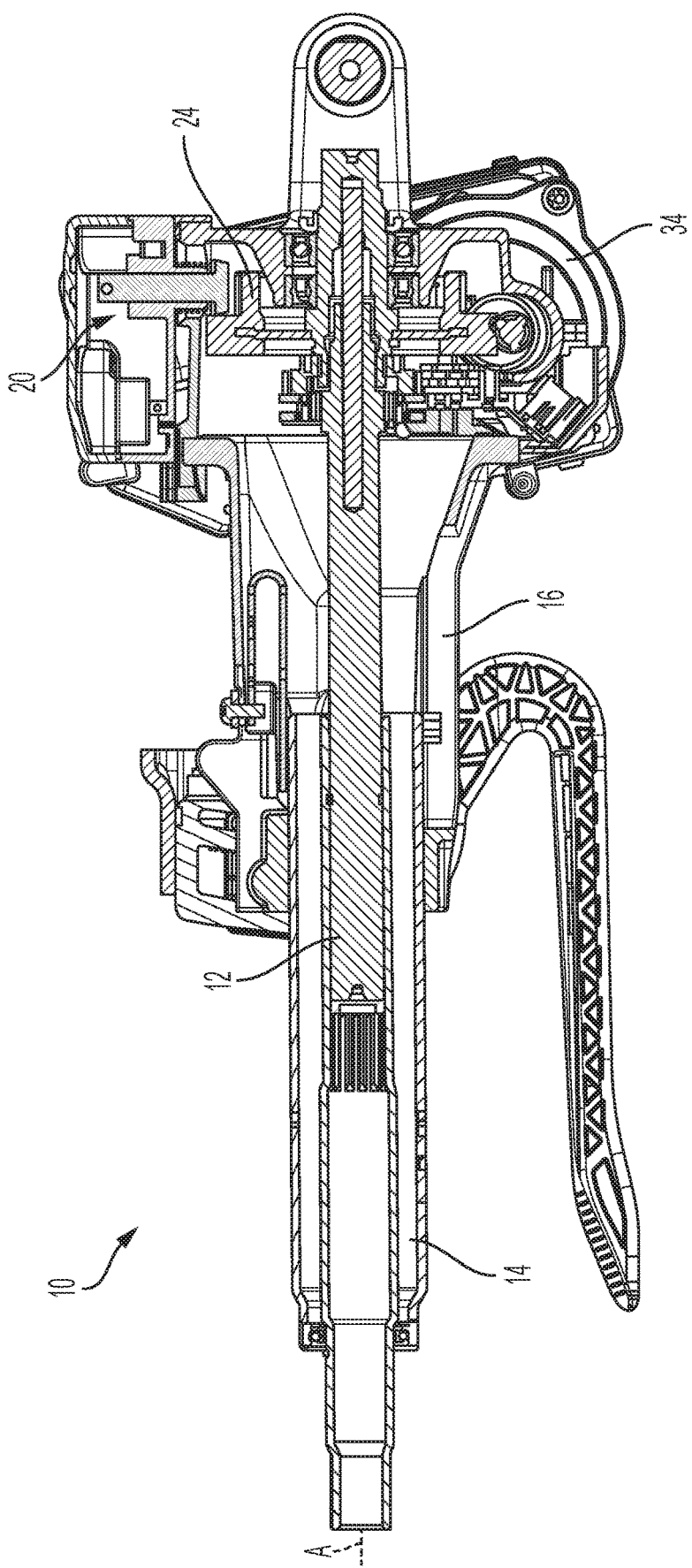
FIG. 1 is a cross-sectional view of a steering column assembly having an steering assist system.

Referring now to the Figures, where the invention will be described with reference to specific embodiments, without limiting same, FIG. 1 illustrates a vehicle steering column assembly 10 that is provided to steer a vehicle in a desired direction. The steering column assembly 10 includes one or more pieces that form a steering shaft 12 that is turned to steer the vehicle. The steering shaft 12 is located, at least partially, within one or more jackets, such as the illustrated upper jacket 14 and lower jacket 16.

Figure 4:
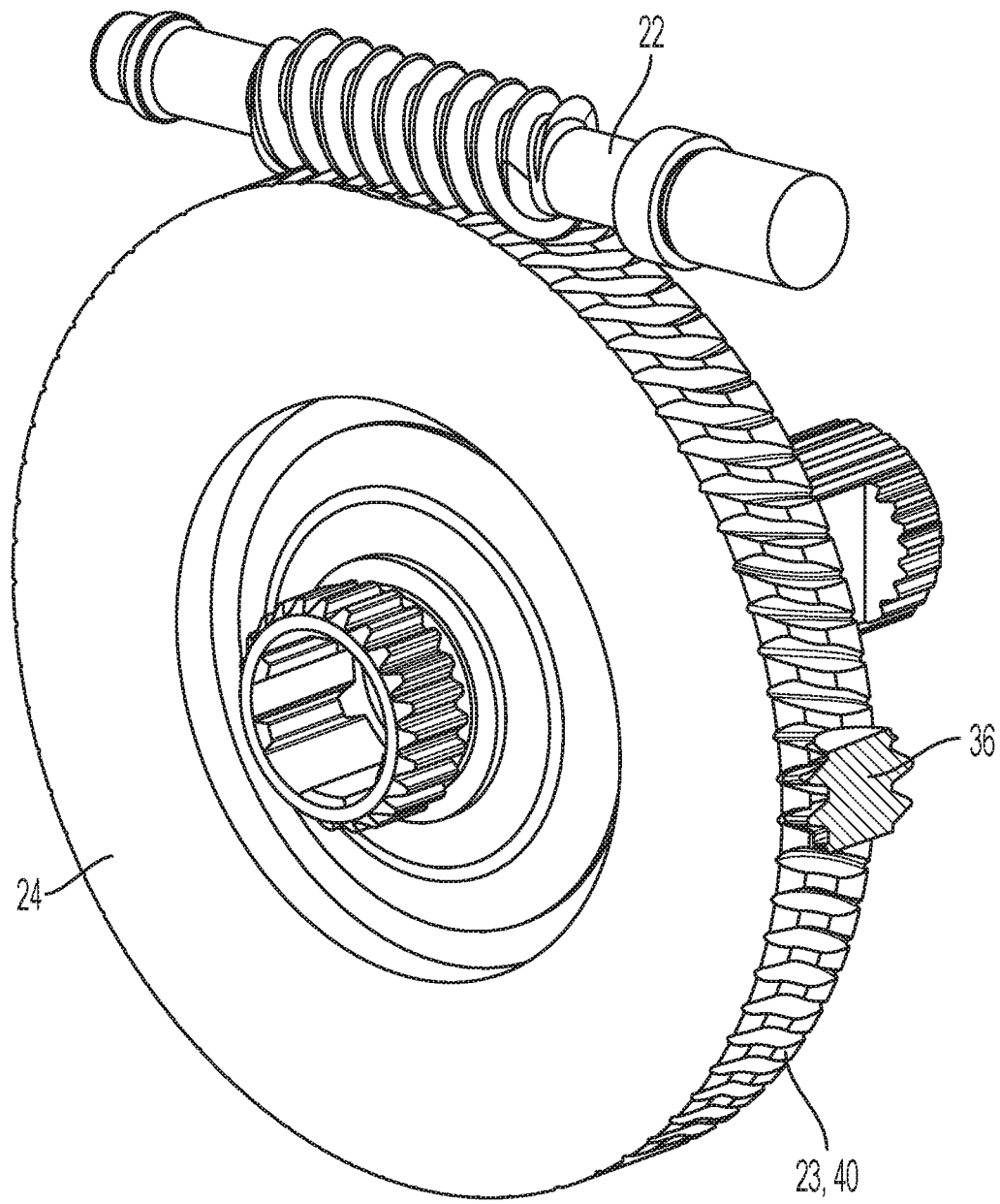
FIG. 4 is a perspective view of the steering assist system with a lock feature of the lock mechanism according to one aspect of the disclosure.
Figure 6:
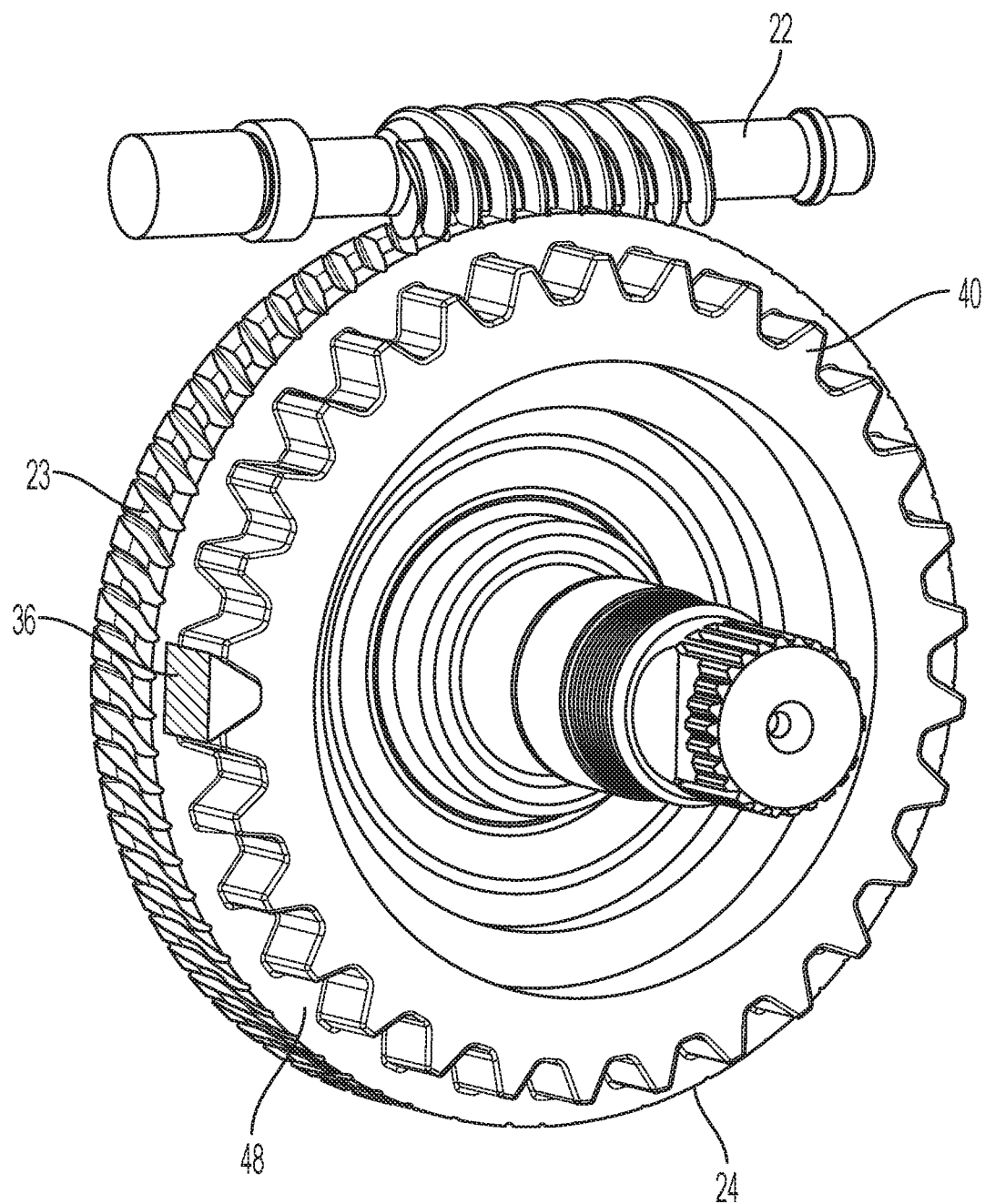
FIG. 6 is a perspective view of the steering assist system with a lock feature of the lock mechanism according to another aspect of the disclosure.

The steering column assembly 10 includes a steering assist system 20 that includes an actuator (not shown), such as an electric motor, that is coupled to a worm 22. The worm 22 is in meshed engagement with a first set of teeth 23 of a worm gear 24, as shown in FIGS. 1, 4 and 6. The worm gear 24 is operatively connected to the steering shaft 12 to provide an assist torque to a manual torque input from a driver. In certain conditions, it is desirable to resist rotation of the worm gear 24. This may be part of an anti-theft system, for example.

Figure 3:
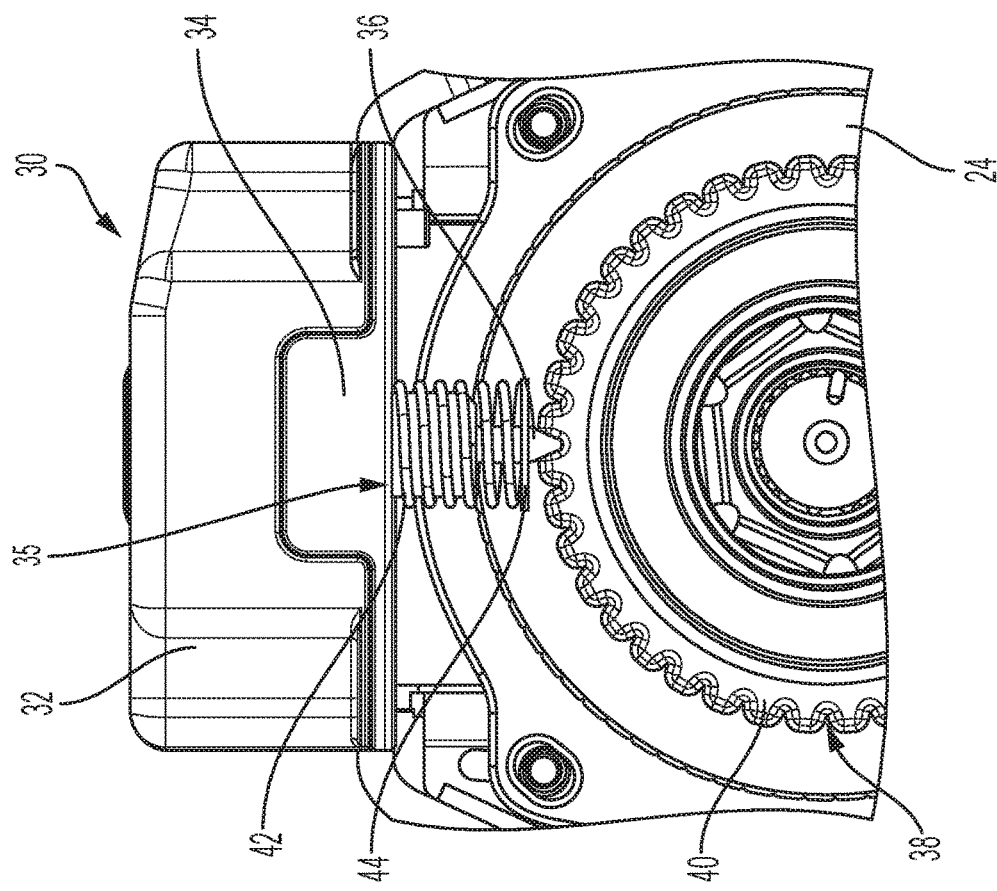
FIG. 3 is an elevational view of the lock mechanism in a locked position.
Figure 2:
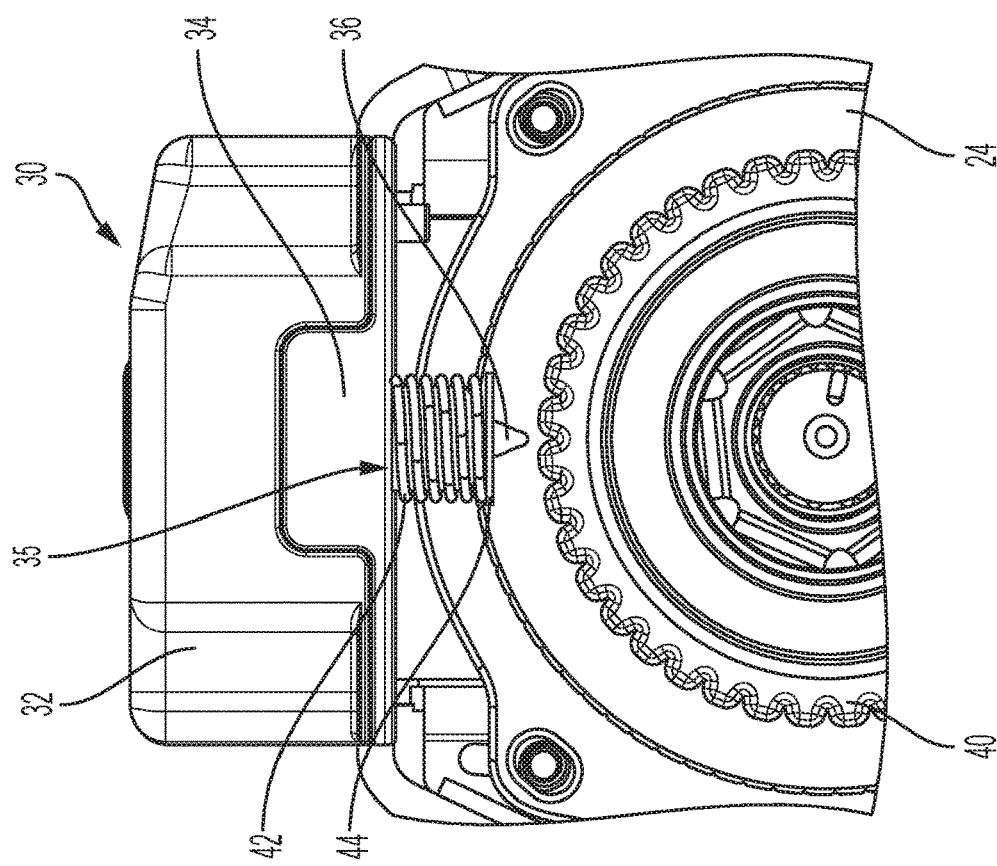
FIG. 2 is an elevational view of a lock mechanism for the steering assist system in an unlocked position.

Referring now to FIGS. 2 and 3, a lock mechanism 30 for the steering assist system 20 is shown. The lock mechanism 30 is part of a lock module (referenced generally with numeral 32) that is integrated within a steering assist system housing 34 (FIG. 1). The lock module 32 includes a slide assembly 35 that is translatable in response to operation of an actuator. In some embodiments, the actuator is a solenoid.

A lock feature 36 is operatively coupled to the slide assembly 34 for translation between an unlocked condition (FIG. 2) and a locked condition (FIG. 3) of the steering assist system 20 and, more particularly, the worm gear 24. The lock feature 36 is formed, in whole or in part, with a wedge shaped geometry. In other words, the lock feature 36 may be a wedge shaped feature or may include a wedge shaped feature that is part of a larger structure. In some embodiments, the lock feature 36 is formed of plastic, but alternative materials are contemplated such as metal, for example.

As shown in FIG. 3, the lock feature 36 is positioned within a recess 38 of the worm gear 24 that is defined by adjacent teeth that are part of a second set of teeth 40 of the worm gear 24. The lock feature 36—when positioned to be in the locked condition of FIG. 3—engage the second set of teeth 40 of the worm gear 24 to resist the separation forces of the gear teeth as torque is applied to the worm gear 24. This resistance is attributed to a spring resistance provided by a spring 42 that is disposed between the lock module 32 and a support structure 44 (e.g., washer or the like). The biasing force applied to the lock feature 36 with the spring 42 would be matched to the resistance needed for slip to occur after meeting a minimum torque requirement. As such, the lock feature 36—when in the locked condition—resists rotation of the worm gear 24 within a predetermined range of torque, but allows the lock feature 36 to slip over a tooth of the second set of teeth 40 to an adjacent recess of the second set of teeth 40 once a threshold torque is applied. For example, the positioning of the lock feature 36 within the recess 38 prevents movement up to about 200 N-m, but a torque greater than this results in slippage of the lock feature 36 over a tooth of the second set of teeth 40. Upon slipping to an adjacent recess, the lock feature 36 returns to resistance of movement of the worm gear 24.

In the embodiments of FIGS. 4-7, the lock feature 36 translates into and out of engagement (i.e., locked condition and unlocked condition) with the second set of teeth 40 in a radial direction that is perpendicular to a longitudinal axis A (FIG. 1) of the steering column assembly 10. In the illustrated embodiments, the second set of teeth 40 extends circumferentially around the worm gear 24.

Figure 5:
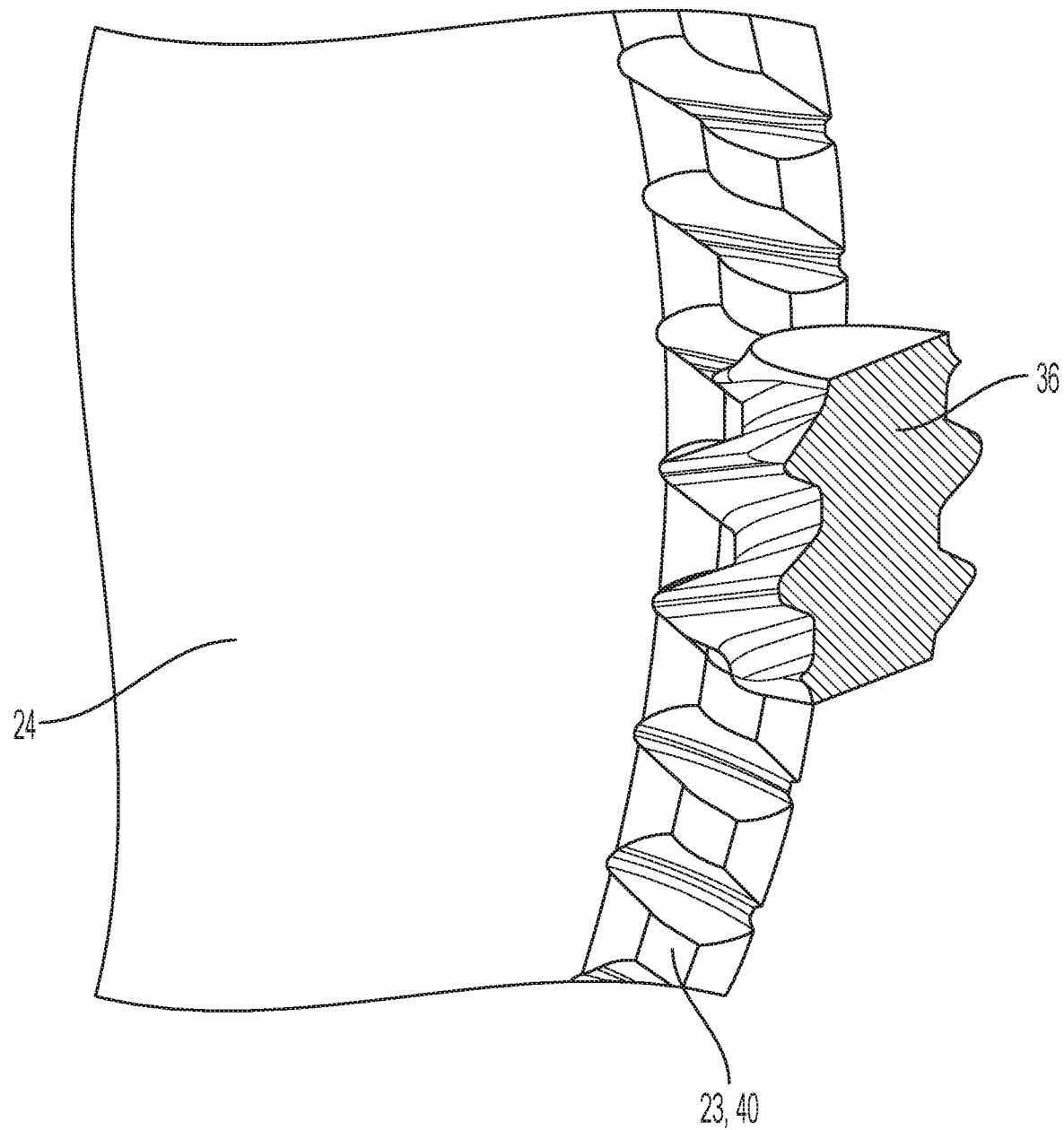
FIG. 5 is a perspective view of a lock of the lock feature of FIG. 4.
Figure 7:
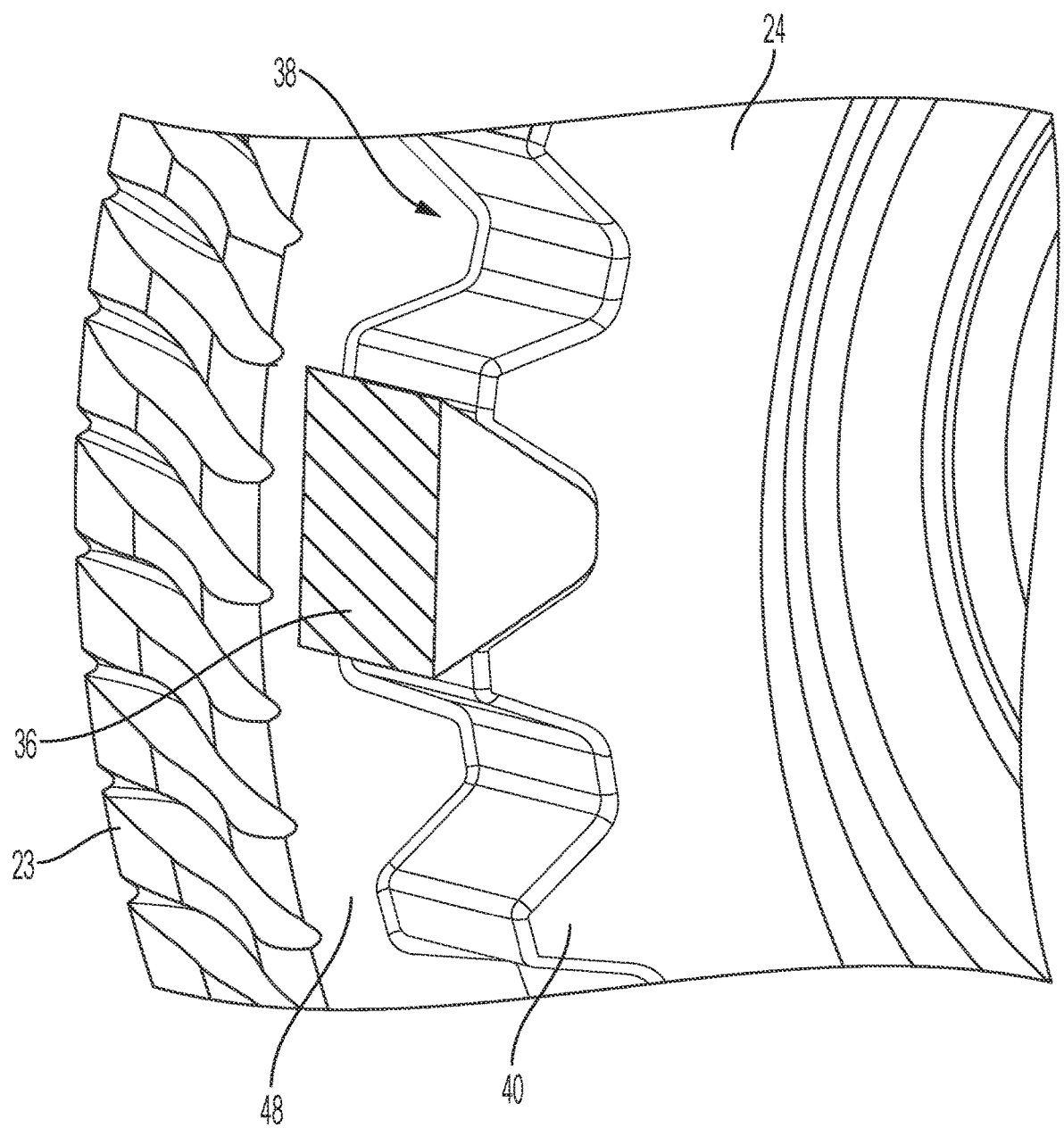
FIG. 7 is a perspective view of a lock of the lock feature of FIG. 6.

In FIGS. 4 and 5, the second set of teeth 40 extends to an outer diameter that is common to the first set of teeth 23. In the embodiments of FIGS. 6 and 7, the worm gear 24 includes a first outer diameter and a second outer diameter joined by a radially extending step 48. The first set of teeth 23 extends around the first outer diameter of the worm gear 24 and the second set of teeth 40 extends about the second outer diameter of the worm gear 24, with the first outer diameter extending further radially outwardly than the second outer diameter.

Figure 10:
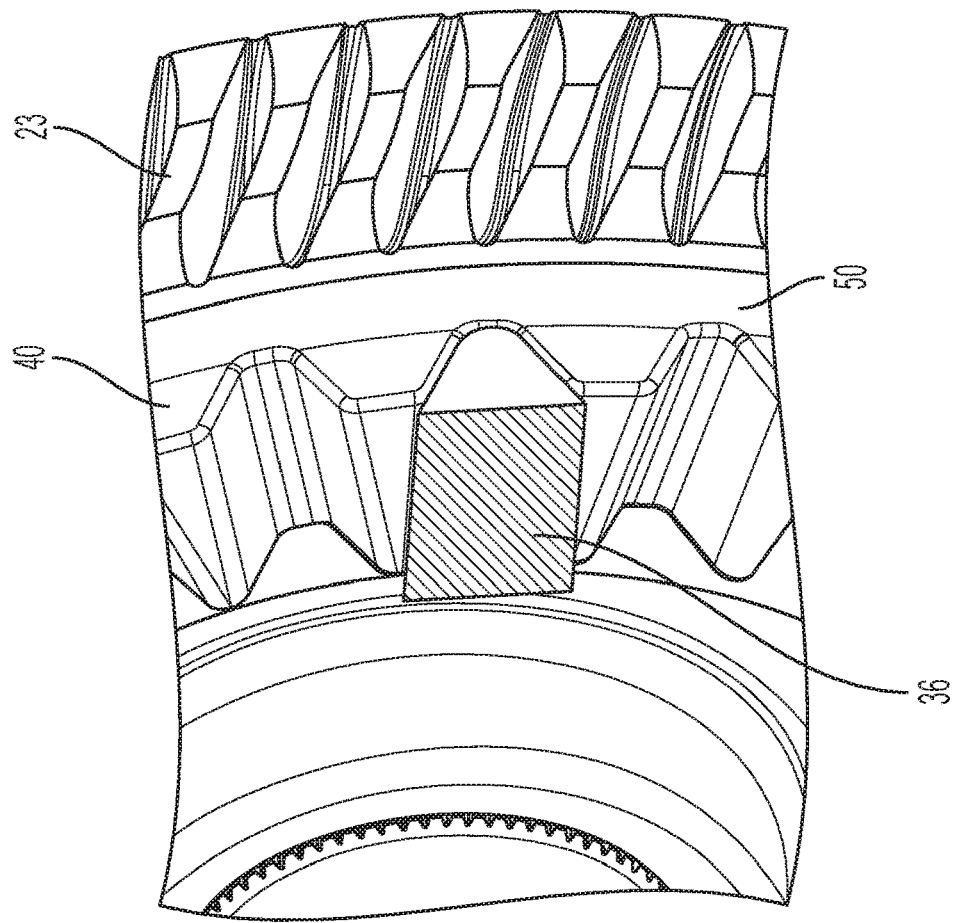
FIG. 10 is a perspective view of the lock mechanism of FIG. 9.
Figure 9:
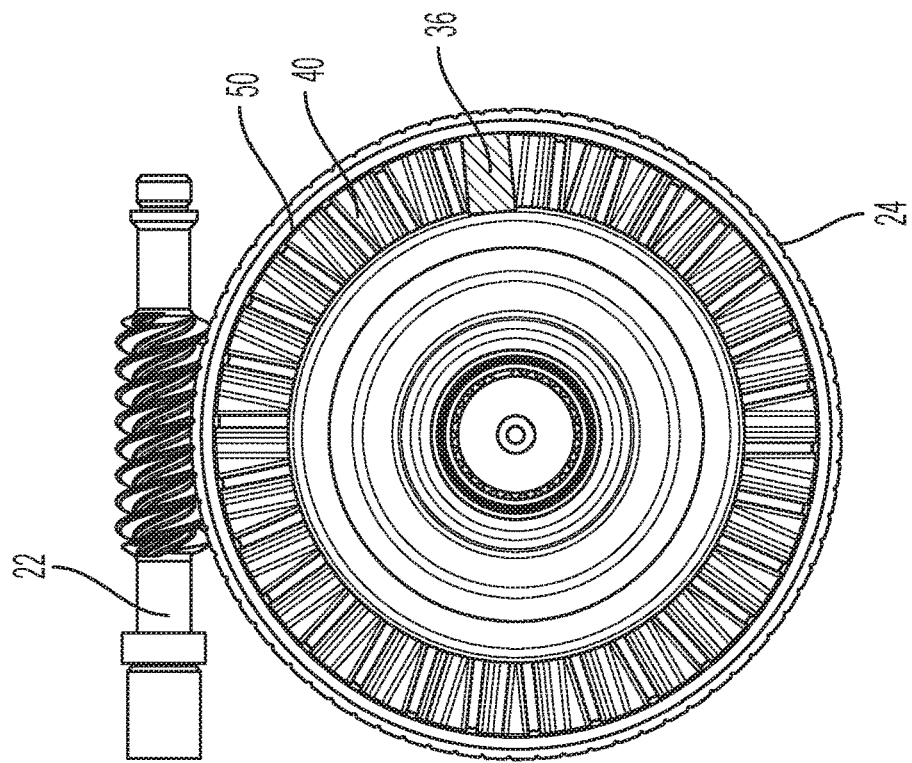
FIG. 9 is an elevational view of the lock mechanism according to another aspect of the disclosure.

FIGS. 9 and 10 illustrate an axially moveable lock feature 36. In particular, the second set of teeth 40 is formed on a face 50 of the worm gear 24 and the lock feature 36 is moveable into and out of engagement with the second set of teeth 40 in an axial direction parallel the longitudinal axis A of the steering column assembly 10 (FIG. 1).

Figure 8:
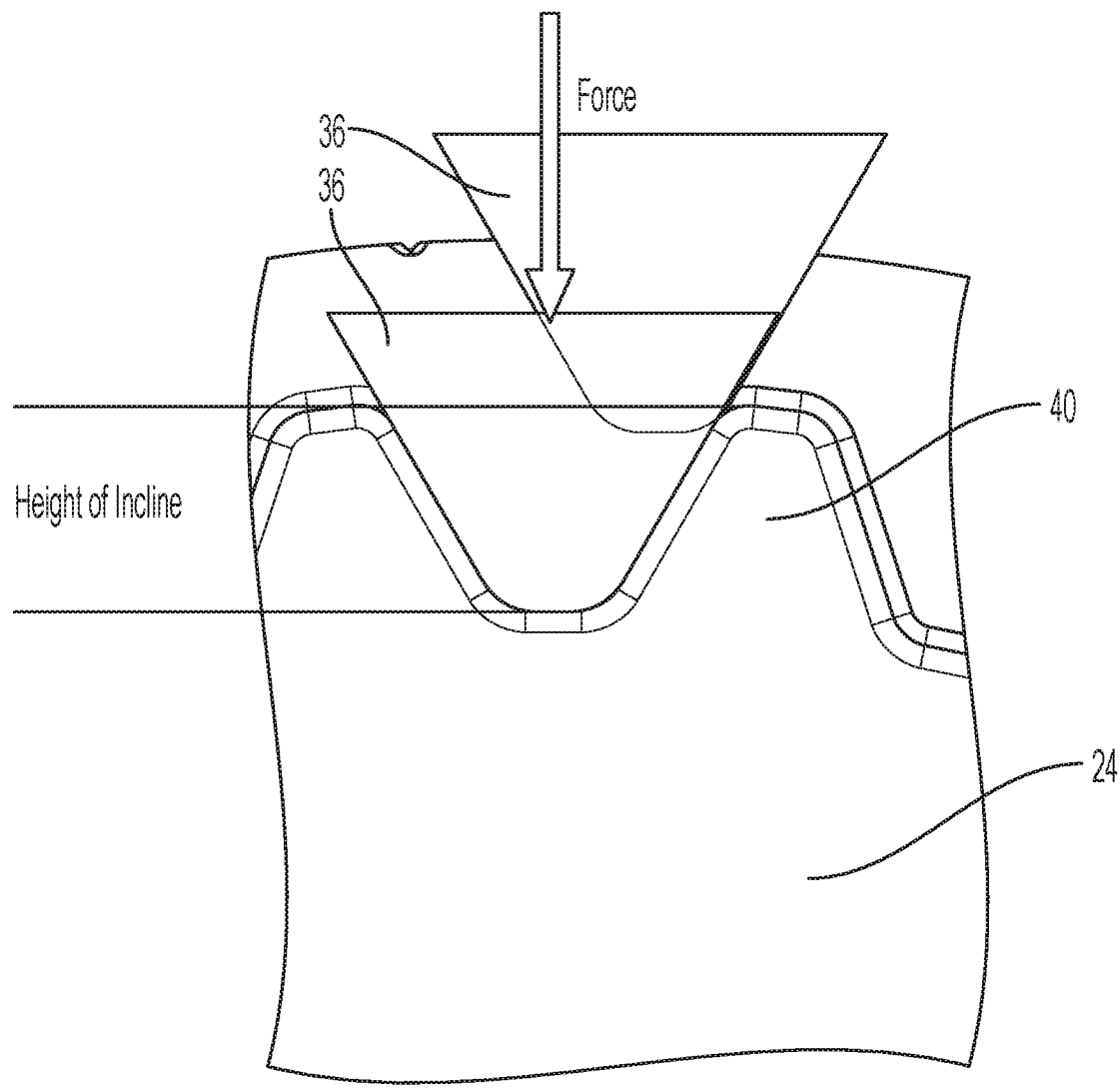
FIG. 8 is an elevational view of an interface between the lock mechanism and the steering assist system.

Referring now to FIG. 8, the tunable or customizable nature of the lock mechanism 30 is illustrated. Specifically, the spring 42 can be matched to the resistance needed for slip to occur after meeting a minimum torque requirement. As the worm gear 24 rotates, the lock feature 36 moves up the incline of the opposing teeth. This relationship allows the amount of spring force, the height of the teeth 40 and/or lock feature 36, as well as the incline angle of the teeth 40 and/or lock feature 36 to be adjusted to achieve the desired amount of "breakaway torque." When disengagement occurs, the lock feature 36, due to being spring loaded, re-engages the next available recess of the second set of teeth 40.

The embodiments described herein provide a lock feature that can be an "as molded" part (i.e., no additional machining) that operates in the slide assembly of the housing with an accompanying spring 42 to serve as the force component of the lock mechanism 30. The disclosed lock mechanism 30 is less complex and results in a reduced cost, when compared to typical lock mechanisms for similar applications. Hand assembly of the lock mechanism 30 is possible, thereby avoiding assembly machines and their associated costs. The lock mechanism 30 also reduces the axial packaging requirements when compared to typical lock mechanisms and reduces weight.

In addition to the advantages described above, the lock mechanism 30 provides benefits associated with what are referred to herein as ingress/egress events or loads. In particular, many drivers use a steering wheel attached to the steering column assembly 10 as a handle during ingress or egress of the vehicle. Prior steer-by-wire systems use an EPS motor to resist such a load and this is the highest torque requirement for steer-by-wire systems. However, the mechanical lock mechanism 30 described herein resists the ingress/egress events, thereby allowing for a smaller motor and/or a smaller overall system. A significant reduction in motor size on steer-by-wire systems may be achieved, while still having adequate resistance for ingress/egress loads. The lock mechanism may be adjusted or tuned to the proper slip-torque to avoid damage to any of the EPS components while still maintaining the proper resistive loading for driver ingress/egress.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steering assist system of a steering column assembly comprising:
    a worm rotatably driven by an actuator;
    a worm gear having a first set of teeth at an outer diameter of a first portion of the worm gear and a second set of teeth at an outer diameter of a second portion of the worm gear, wherein the first set of teeth, the second set of teeth and the worm gear are a single, molded component, wherein the worm gear, the first set of teeth and the second set of teeth are formed of the same material, wherein the second portion of the worm gear protrudes from a first side of the first portion of the worm gear, the first set of teeth in meshed engagement with the worm, the worm gear operatively coupled to a steering shaft; and
    a lock feature moveable into and out of engagement with the second set of teeth of the worm gear to define a locked condition and an unlocked condition of the worm gear,
    wherein the second set of teeth extends circumferentially around the worm gear, the lock feature moveable into and out of engagement with the second set of teeth in a radial direction perpendicular to a longitudinal direction of the steering column assembly, wherein the lock feature is wedge shaped to correspond to a geometry of a recess between adjacent teeth of the second set of teeth of the worm gear, wherein the lock feature is disposed within the recess in the locked condition, the lock feature loaded with a spring in the locked condition to resist rotation of the worm gear, wherein a spring force of the spring and the angle of the second set of teeth resist a predetermined torque range applied to the worm gear, wherein a torque exceeding the predetermined torque range results in the lock feature to move to an adjacent recess of the second set of teeth.

2. The steering assist system of claim 1, wherein the lock feature is moved from the unlocked condition to the locked condition with an actuator.

3. The steering assist system of claim 2, wherein the actuator is a solenoid.

4. The steering assist system of claim 1, wherein the second set of teeth and the first set of teeth extend to a common outer diameter.

5. The steering assist system of claim 1, wherein the worm gear includes a first outer diameter and a second outer diameter joined by a radially extending step, the first set of teeth extending around the first outer diameter of the worm gear, the second set of teeth extending about the second outer diameter of the worm gear.

6. The steering assist system of claim 5, wherein the first outer diameter extends further radially than the second outer diameter.

\* \* \* \* \*